United States Patent Office
2,932,678
Patented Apr. 12, 1960

2,932,678
PROCESS OF PRESERVING FRESHLY HARVESTED RUBBER LATEX
Kalyanaramaiyer Chandra Sekaran and John Edward Morris, Kuala Lumpur, Malaya, assignors to The British Rubber Producers' Research Association, London, England, a body corporate of Great Britain No Drawing. Application November 5, 1956
Serial No. 620,215
1 Claim. (Cl. 260—820)

The invention relates to the preservation of natural rubber latex obtained from *Hevea brasiliensis*, both on a short term basis for fresh latex, including anticoagulants added to the latex prior to the making of sheet and crepe, temporary preservatives added to latex prior to the preparation of concentrate, and on a long term basis for the preservation of latex concentrates during shipment and storage prior to use.

The temporary preservation of latex fresh from the tree is of importance in avoiding blemishes in sheet rubber produced from the latex, particularly bubbles and dark colourations.

Natural rubber latex is commonly preserved with small quantities of chemicals usually called anticoagulants in order to prevent precoagulation and bacterial attack before dilution and subsequent coagulation to produce sheet and crepe rubber. Anticoagulants in common use are ammonia, formaldehyde, sodium sulphite, sodium carbonate and they are usually employed in a concentration of 0.01 to 0.1 percentage by weight added in water solution to the field latex either in the latex cup attached to the tree or in the vessel used for latex collection. It is well known that the action of these anticoagulants is at least two-fold, firstly by killing or repressing the growth of bacteria which readily and always contaminate the latex under normal production conditions, particularly those which produce gas in their metabolic cycle. Secondly the action is to prevent coalescence of the individual latex globules to form clots by a lowering of the latex viscosity or by sequestering or precipitating metal ions such as $Mg^{++}$ and $Ca^{++}$. Certain of the anticoagulants noted above are more effective in one or other of the anticoagulant processes. Field latex from some areas does not require anticoagulants and usually latex is only defective in one aspect so that one anticoagulant only is necessary. Occasionally a latex is defective in both the bacterial and chemical aspects and mixed anticoagulants are necessary.

When formaldehyde and ammonia anticoagulants are used an activation of enzymes producing dark pigments in the latex takes place and the final dry rubber sheet often has a dark colour. This is no disadvantage when producing smoked sheet but is a definite defect when lightly smoked or air dried sheet often called pale amber unsmoked sheet is being made.

One of the objects of the present invention is to obtain a well preserved field latex which on coagulation in the usual manner gives a sheet of light colour free from bubbles and other defects.

According to this aspect of the present invention, boric acid associated with from one-third to three times of the stoichiometric quantity of ammonia required to replace the three hydrogen atoms in boric acid as described by the following formula $H_3BO_3$ either in association or combination is added to field latex in aqueous solution at concentrations from 0.02 to 0.2 percentage by weight based on the latex and the total ammonia plus boric acid added.

It is desirable in carrying out the preservation treatment to add the ammonia and boric acid anticoagulant (also referred to as ammonium borate) as soon after tapping as practicable although appreciable improvements of the product are effected if the anticoagulant is added at any time before acid coagulation. The following example is illustrative of the present invention.

EXAMPLE I

In order to facilitate comparison of the effectiveness of several anticoagulants latex from slaughter and ladder tapped trees on an estate in Selangor, Maylaya, where severe contamination of the latex was occurring was brought to a nearby factory and bulked. The bulked latex was separated into six batches of approximately 5 gallons and the following anticoagulants added in the quantities given: (1) no addition as control; (2) 0.03 percentage by weight of ammonia as a 3 percentage by weight aqueous solution; (3) 0.06 percentage by weight formaldehyde as a 3 percentage by weight aqueous solution; (4) 0.08 percentage by weight of sodium sulphite as a 3 percentage by weight aqueous solution; (5) 0.06 percentage by weight formaldehyde plus 0.06 percentage by weight sodium carbonate as a 6 percentage by weight aqueous solution; (6) 0.039 percentage by weight of boric acid plus 0.031 percentage by weight of ammonia added as a 3 percentage by weight aqueous solution.

After stirring in the respective anticoagulants the latices were stood for two hours, diluted to 1¼ lbs. per gallon dry rubber content and coagulated with formic acid in the normal quantity. The coagula were left overnight, machined the next day and dried in five days in a conventional type smoke-house. The sheets from each treated latex were then examined. The control samples (1) were a medium brown colour containing small bubbles completely dispersed throughout the sheets. The ammonia treated sheets (2) were dark brown with a few clusters of bubbles dispersed through the sheets. The formaldehyde treated sheets (3) were free from bubbles but were dark brown. The sodium sulphite sheets (4) were a light medium brown with small bubbles completely dispersed throughout the sheets. The formaldehyde and sodium carbonate sheets (5) were medium brown in colour but with a few dispersed bubbles in parts of the sheet. The boric acid ammonia preserved sheets were light brown in colour and also free from bubbles. Examination of the sheets thus indicated the formaldehyde and boric acid ammonia preservatives to be superior in preventing bubble formation but the latter to be superior in producing a light coloured rubber. Vulcanisation tests indicated that the boric acid ammonia anticoagulant had no effect on the vulcanising properties of the rubber.

The invention also relates to the preservation of raw natural rubber latex from the *Hevea brasiliensis* tree prior to the preparation of concentrated latex. It is well known that in the preparation of centrifuged latex ammonia is added to the latex as soon as possible in the field and factory in an amount between 0.3 and 1.0 percentage by weight as a temporary preservative until the latex can be centrifuged. The amount of ammonia added to the latex is dependent on the conditions of transport and storage, and the duration of storage before centrifuging. In commercial practice field latex quickly ammoniated to 0.3 percentage by weight processes to give a good quality concentrate up to 24 hours after tapping, for processing periods of 36 hours, 2 days, 3 days and 1 week after tapping 0.4, 0.6, 0.8 and 1.0 percentages by weight respectively of ammonia need to be added at the time of collection. It is well known also that if latices are stored for periods in excess of those mentioned for given amounts of ammonia preservative, rapid putrefaction occurs and this is evidenced by bacterial counts and by the volatile fatty acid number of the latex which rises rapidly. Concentrated latex prepared from such putrefied latex, which is deemed to be a latex with a V.F.A. number (volatile fatty acid number) of 0.15 or more, has a high V.F.A. number usually in excess of 0.05 and low mechanical stability.

It is evident that a temporary preservative which would store lightly ammoniated field latex without putrefaction for periods of up to 7 to 10 days would be advantageous in transporting field latex over long distances to a central processing factory or for storing field latex for short periods as is sometimes necessary during plant failures and on other occasions. The advantage of reducing the ammonia content with consequent saving in chemicals in processing the field latex and skim latex is also apparent. It is well known that addition of 0.05 percentage by weight of formaldehyde to field latex preserved with 0.3 percentage by weight of ammonia either before or immediately after the addition of the ammonia enables the latex to be stored for an additional two days, that is for three days after tapping.

One of the objects of this present invention is to obtain a well preserved low ammoniated field latex for storage periods up to 10 days prior to centrifuging.

According to the present invention boric acid added in quantities ranging from 0.05 to 0.2 percentage by weight to low ammoniated latex such as that preserved with 0.3 percentage by weight of ammonia will appreciably lengthen the storage time of the latex without signs of putrefaction from 1 to 10 days. Boric acid added in quantities of 0.05, 0.1 and 0.2 percentages by weight preserve 0.3 percentage by weight ammoniated field latex without signs of putrefaction for periods of 2, 4 and 10 days respectively.

It is desirable in carrying out the present invention to add the recommended 0.3 percentage by weight of ammonia as soon as possible after tapping either at the collecting station or at the factory and then to add 0.05 to 0.2 percentage by weight of boric acid according to the period of preservation required to the ammoniated latex in the form of a 5 percentage by weight solution of boric acid in water. The following examples illustrate the present invention.

EXAMPLE II 4 gallons of field latex from mixed clonal and seedling areas at the Rubber Research Institute Experiment Station, Sungei Buloh, Malaya, ammoniated in the field and on reception at the factory to a total ammonia content of 0.30 percentage by weight on a normal tapping day without interference by rain were taken and divided into five batches each of 1 gallon and placed in a stoppered demijohn. To the 1 gallon batches were added boric acid as a 5 percentage by weight aqueous solution to give concentrations of nil, 0.05, 0.10 and 0.20 percentage by weight of boric acid on latex respectively. The boric acid solutions were mixed with the latices and the demijohns stoppered and stored.

As a measure of the putrefaction the volatile fatty acid number of the latex in each demijohn was determined on samples drawn at approximately daily intervals. These figures are given as follows in Table I.

Table I

[Boric acid as a temporary preservative of 0.30 percentage by weight ammoniated field latex. Collection on dry day. Volatile fatty acid number of latex versus period of storage.]

| Age of Field Latex, days | Boric Acid Content of Latex, Percent wt. | | | |
|---|---|---|---|---|
| | Nil | 0.05 | 0.10 | 0.20 |
| 0 | 0.02 | 0.02 | 0.02 | 0.02 |
| 1 | *0.03 | 0.02 | 0.02 | 0.02 |
| 2 | 0.11 | 0.02 | 0.02 | 0.02 |
| 3 | | *0.08 | 0.05 | 0.02 |
| 5 | | | *0.36 | 0.03 |
| 6 | | | | *0.03 |

EXAMPLE III 4 gallons of field latex were collected, on a day when rain interfered with tapping, from the same areas as in Example II. The latex was ammoniated to 0.35 percentage by weight but was otherwise treated in an exactly similar manner. The rate of putrefaction was also assessed as previously by the volatile fatty acid number test and the results of the preservation are given in Table II.

Table II

[Boric acid as a temporary preservative of 0.35 percentage by weight ammoniated field latex. Collection on a wet day. Volatile fatty acid number of latex versus period of storage.]

| Age of Field Latex, days | Boric Acid Content of Latex, Percent wt. | | | |
|---|---|---|---|---|
| | Nil | 0.05 | 0.10 | 0.20 |
| 0 | 0.02 | 0.02 | 0.02 | 0.02 |
| 1 | *0.01 | 0.01 | 0.01 | 0.01 |
| 2 | 0.01 | 0.01 | 0.01 | 0.01 |
| 3 | 0.13 | 0.02 | 0.01 | 0.01 |
| 4 | 0.30 | *0.20 | 0.02 | 0.01 |
| 6 | 0.50 | | 0.02 | 0.01 |
| 7 | 0.60 | | *0.13 | *0.03 |

EXAMPLE IV 4 gallons of fluid latex were collected free from interference by rain and treated in a similar manner to Example II. The rate of putrefaction is illustrated in the following Table III.

Table III

[Boric acid as a temporary preservative of 0.30 percentage by weight ammoniated field latex. Collection on a dry day. Volatile fatty acid number of latex versus period of storage.]

| Age of Field Latex, days | Boric Acid Content of Latex, Percent wt. | | | |
|---|---|---|---|---|
| | Nil | 0.05 | 0.10 | 0.20 |
| 0 | 0.03 | 0.03 | 0.03 | 0.03 |
| 1 | *0.03 | 0.03 | 0.03 | 0.03 |
| 3 | 0.40 | *0.40 | *0.05 | 0.04 |
| 4 | 0.60 | | | 0.05 |
| 5 | | | | 0.06 |
| 11 | | | | *0.08 |

In Examples II, III and IV the latices were centrifuged at the time of the test marked with an asterisk smaller samples being retained in the demijohn for V.F.A. number tests.

The invention also relates to the long term preservation of ammoniated centrifuged or creamed concentrated latex from the *Hevea brasiliensis* tree. A concentrated latex may be a latex of any dry rubber content which has been prepared by carrying out a process which increases the dry rubber content of the field latex; however the concentrated latex referred to herein is as usually understood to be latex with a dry rubber content of about 60 percentage weight or above. It is well known that centrifuged concentrated latex containing 0.1 to 0.3 percentage by weight of ammonia can be adequately preserved for long periods of many years by the addition of from 0.1 to 0.2 percentage by weight of sodium pentachlorphenate, or from 0.01 to 0.03 percentage by weight of acriflavine on the latex as bactericides. These bactericides suffer from the disadvantages that they are excessively poisonous to lower forms of life such as fish and present considerable effluent disposal problems in factories where they are used and also give brown or yellow coloured films on coagulation. It can be appreciated that a preservative which can give a pale coloured film on coagulation and present no effluent disposal problem is of great value in the manufacture of latex products. The reduction of ammonia used in preservation of natural rubber latex also results in a considerable saving of chemicals and also in the time spent in deammoniating latex prior to processing as is required in many latex applications.

Another of the objects of the present invention is to obtain a well preserved good quality concentrated latex containing a low ammonia content and a preservative which gives rise to no problems of effluent disposal and gives a light coloured film on drying or coagulation.

According to the present invention boric acid added in quantity ranging from 0.1 to 0.4 percentage by weight added to concentrated latex containing 0.1 to 0.3 percentage by weight of ammonia and preferably 0.3 percentage by weight of boric acid and 0.2 percentage by weight of ammonia will preserve the latex without putrefaction indefinitely.

It is desirable when carrying out the present invention to adjust the ammonia content of the concentrated latex fresh from the centrifuge if less than 0.2 percentage by weight immediately after centrifuging and then to add the required amount of boric acid either as 5 percentage by weight cold solution or as a 15 percentage by weight solution at 60° C. or as a 25% dispersion to minimise the lowering of the concentrate dry rubber content. It was found that low ammonia containing concentrated latices preserved with boric acid do not increase in mechanical stability as rapidly as normally preserved latices with ammonia or ammonia and sodium pentachlorphenate preservative. It is desirable when a mechanically stable latex is required to add a soap to the boric acid ammonia preserved latex. All soaps which may be used in ammoniated latex may be used and their use is illustrated. The following examples are illustrative but not limiting of the present invention.

EXAMPLE V

The normal bulked field latex crop from the Rubber Research Institute Experiment Station, Sungei Buloh, Malaya, was stood overnight after ammoniation to 0.3 percentage by weight and centrifuged in the normal manner. Three gallons of the bulk concentrate were taken before further ammoniation and divided into six half gallon lots numbered 1 to 6 and treated as follows: No. 1 was ammoniated to 0.7 percentage by weight; No. 2 was ammoniated to 0.2 percentage by weight; No. 3 was ammoniated to 0.2 percentage by weight and 0.15 percentage by weight of sodium pentachlorphenate was added; No. 4 was ammoniated to 0.2 percentage by weight and 0.1 percentage by weight of boric acid was added as a 5 percentage by weight aqueous solution; No. 5 was ammoniated to 0.2 percentage by weight and 0.15 percentage by weight of boric acid added as a 5 percentage by weight aqueous solution; No. 6 was ammoniated to 0.2 percentage by weight and 0.30 percentage by weight boric acid added as a 5 percent aqueous solution. The half gallon lots of latex were stored in half gallon bottles and samples were withdrawn for test after 10, 30 and 60 days. The putrefaction of the latices were followed by means of the volatile fatty acid number of the latex and the preserving qualities are clearly shown in the following Table IV.

Table IV

[Long term preservation of 0.2 percentage by weight ammoniated latex with boric acid compared with normally ammoniated and sodium pentachlorphenate preserved latices. Volatile fatty acid number of latex versus storage time.]

| Sample | V.F.A. No. after 10 days' storage | V.F.A. No. after 30 days' storage | V.F.A. No. after 60 days' storage |
|---|---|---|---|
| 1. 0.7% wt. ammonia | 0.02 (360) | 0.03 (660) | 0.02 (800) |
| 2. 0.2% wt. ammonia | 0.52 (40) | Coagulated | |
| 3. 0.2% wt. ammonia+0.15% wt. sodium pentachlorphenate | 0.02 (555) | 0.05 (835) | 0.04 (805) |
| 4. 0.2% wt. ammonia+0.1% wt. boric acid | 0.10 (60) | 0.20 (135) | 0.20 (100) |
| 5. 0.2% wt. ammonia+0.15% wt. boric acid | 0.02 (70) | 0.09 (110) | 0.07 (130) |
| 6. 0.2% wt. ammonia+0.3% wt. boric acid | 0.02 (70) | 0.03 (125) | 0.03 (160) |

The figures in parentheses are the mechanical stabilities of the latices determined by the A.S.T.M. method at the time of test.

EXAMPLE VI

The normal field latex crop at the Rubber Research Institute Experiment Station, Sungei Buloh, Malaya, was treated and centrifuged in a similar manner to that in Example V and six separate half gallon lots numbered 1 to 6 of the bulk concentrate from the centrifuges were ammoniated to 0.2 percentage by weight and then treated as follows: No. 1 further ammoniated to 0.7 percentage by weight; No. 2 no further treatment; No. 3 0.2 percentage by weight boric acid added as a 5 percentage by weight aqueous solution; No. 4 boric acid added as for No. 3 followed by 0.075 percentage by weight of ammonium laurate; No. 5 boric acid was added as for No. 3 followed by 0.10 percentage by weight of ammonium laurate; No. 6 boric acid was added as for No. 3 followed by 0.1 percentage by weight of Turkey Red Oil. In order to follow the preservation of the latices and the mechanical properties tests were carried out after 10, 30 and 60 days when the V.F.A. number and mechanical stability tests were carried out. While not being tested all latices were kept in ½ gallon closed glass bottles. The results are given in the following Table V.

Table V

[Effect of commonly used Soaps on the mechanical stability (A.S.T.M.) of 0.2 percentage by weight ammoniated concentrated latex preserved with an addition of 0.2 percentage by weight of boric acid after storage to 10, 30 and 60 days.]

| Sample | Mech. Stab. ASTM after 10 days' Storage | Mech. Stab. ASTM after 30 days' Storage | Mech. Stab. ASTM after 60 days' Storage |
|---|---|---|---|
| 1. 0.7% wt. ammonia | 385 (0.02) | 670 (0.02) | 850 (0.02) |
| 2. 0.2% wt. ammonia | 20 (0.5) | Coagulated | |
| 3. 0.2% wt. ammonia+0.2% wt. boric acid | 55 (0.01) | 190 (0.02) | 270 (0.06) |
| 4. 0.2% wt. ammonia+0.2% wt. boric acid+0.075% wt. Ammonium laurate | 285 (0.01) | 615 (0.02) | 610 (0.01) |
| 5. 0.2% wt. ammonia+0.2% wt. boric acid+0.10% wt. Ammonium laurate | 455 (0.02) | 1,150 (0.02) | 1,530 (0.01) |
| 6. 0.2% wt. ammonia+0.2% wt. boric acid+0.20% wt. Turkey Red Oil | 280 (0.01) | 735 (0.02) | 740 (0.01) |

The figures in parenthesis are the V.F.A. numbers determined at the time of test.

An alternative method of incorporating the fatty acid soap is by addition to the field latex before centrifuging. This has the disadvantage that soap is lost during the centrifuging operation, but has the advantage that the soap is added more readily to field latex than to concentrate.

The invention further relates to the long term preservation of lightly ammoniated centrifuged or creamed concentrate latex.

Long term preservation of centrifuged latex can be attained by adding small quantities of a sequestering agent such as ethylene diamine tetraacetic acid together with small quantities of a bactericide such as sodium pentachlorphenate to an alkaline latex. For example, a preserved latex may be obtained by adding 0.1 percentage by weight of each of these reagents. The sequestering agent is particularly flexible and compounds such as sodium tripolyphosphate may be used in this connection. This type of latex suffers to lesser degree in that it gives rise to effluent disposal problems and that films produced from the latex are usually brown in colour.

Another of the objects of the present invention is to obtain a well preserved good quality concentrated latex containing a low ammonia content and preservatives giving no effluent problems and a light coloured film on coagulation.

According to this aspect of the present invention concentrated latex containing a small quantity of ammonia and small quantities of a sequestering agent and boric acid is preserved for a considerable period.

It is desirable when carrying out the present invention to rapidly centrifuge field latex preserved only to 0.2 percentage by weight of ammonia before centrifuging. The ammonia content is then made up to 0.1 percentage by weight and to the concentrate is added 0.1 percentage by weight of a sequestering agent particularly the ammonium salt of ethylene diamine tetraacetic acid followed by 0.1 percentage by weight on latex of boric acid as a 5 percentage by weight cold aqueous solution or a 15 percentage by weight hot (approximately 60° C.) aqueous solution. The following Example VII is illustrative but not limiting of the invention.

EXAMPLE VII

Twenty gallons of representative field latex from the Rubber Research Institute Experiment Station, Sungei Buloh, were collected and preserved with 0.2 percentage by weight of ammonia. The latex was centrifuged after standing two hours in a commercial centrifuge and six representative half gallons of concentrate 1 to 6 from the resulting concentrate were taken and treated as follows: No. 1 fully ammoniated to 0.7 percentage by weight; No. 2 ammoniated to 0.1 percentage by weight no further treatment; No. 3 ammoniated as for No. 2 0.1 percentage by weight of sodium pentachlorphenate added in aqueous solution; No. 4 ammoniated as for No. 2 0.1 percentage by weight of ammonium salt of ethylene diamine tetraacetic acid in aqueous solution together with 0.1 percentage by weight of sodium pentachlorphenate also in aqueous solution; No. 5 ammoniated as for No. 2 0.1 percentage by weight of boric acid was added as a 5 percentage by weight aqueous solution; No. 6 ammoniated as for No. 2 and added 0.1 percentage by weight of ammonium salt of ethylene diamine tetraacetic acid as an aqueous solution followed by 0.1 percentage by weight of boric acid as a 5 percentage by weight aqueous solution. In order to check the preservation the volatile fatty acid numbers of the latices were examined after 2 and 14 days as shown in the following Table VI from which it is seen that the present invention is clearly preventing putrefaction.

Table VI

[Preservation of 0.1 percentage by weight ammoniated latex with 0.1 percentage by weight of ethylene diamine tetra acetic acid ammonium salt and 0.1 percentage by weight of boric acid compared with control samples after storage for 2 and 14 days.]

| Sample | V.F.A. Number after 2 days | V.F.A. Number after 14 days |
|---|---|---|
| 1. 0.7% wt. ammonia | 0.01 | 0.01. |
| 2. 0.1% wt. ammonia | 0.20 | Coagulated. |
| 3. 0.1% wt. ammonia+0.1% wt. Sodium pentachlorphenate. | 0.01 | Coagulated. |
| 4. 0.1% wt. ammonia+0.1% wt. EDTA+0.1% wt. Sodium pentachlorphenate. | 0.01 | 0.01. |
| 5. 0.1% wt. ammonia+0.1% wt. Boric acid | 0.01 | 0.25 (bad smell). |
| 6. 0.1% wt. ammonia+0.1% wt. EDTA+0.1% wt. boric acid. | 0.01 | 0.01. |

What we claim is:

The process of preserving freshly harvested rubber latex from the *Hevea brasiliensis* tree which comprises adding from about 0.3% to 0.4% by weight ammonia to the latex within 12 hours of obtaining the latex from the tree, centrifuging the ammoniated latex to a dry rubber content of about 60% by weight within about 36 hours after obtaining the latex from the tree, adding ammonia to the concentrated latex to increase the ammonia content thereof to about 0.2% by weight of the latex, and substantially immediately adding from 0.1% to 0.3% by weight boric acid to the ammoniated concentrated latex.

References Cited in the file of this patent
UNITED STATES PATENTS

| | | |
|---|---|---|
| 1,644,730 | Kelley et al. | Oct. 11, 1927 |
| 1,699,369 | McGavack et al. | Jan. 15, 1929 |
| 2,101,089 | Novak | Dec. 7, 1937 |
| 2,560,744 | Rhines | July 17, 1951 |